United States Patent
Kim et al.

(10) Patent No.: US 7,355,845 B2
(45) Date of Patent: Apr. 8, 2008

(54) PORTABLE ELECTRONIC DEVICE HAVING A REMOVABLE HARD DISK DRIVE

(75) Inventors: Yoon Soo Kim, Seoul (KR); Sang Hyuk Lee, Daegu-si (KR); Sang Seok Oh, Daegu-si (KR)

(73) Assignee: FUSHIONSOFT Co., Ltd., Daegu-si (KR)

( * ) Notice: Subject to any disclaimer, the term of this patent is extended or adjusted under 35 U.S.C. 154(b) by 0 days.

(21) Appl. No.: 11/563,545

(22) Filed: Nov. 27, 2006

(65) Prior Publication Data

US 2008/0002348 A1    Jan. 3, 2008

(51) Int. Cl.
  *H05K 5/00* (2006.01)
  *H05K 7/00* (2006.01)
  *G06F 1/16* (2006.01)

(52) U.S. Cl. ............... 361/685; 361/683; 361/684; 361/686

(58) Field of Classification Search ............... 361/685, 361/681, 683, 684, 686
  See application file for complete search history.

(56) References Cited

U.S. PATENT DOCUMENTS

| | | | | |
|---|---|---|---|---|
| 4,941,841 | A | * | 7/1990 | Darden et al. ............... 361/685 |
| RE34,369 | E | * | 9/1993 | Darden et al. ............... 439/377 |
| 5,515,237 | A | * | 5/1996 | Ogami et al. ............... 361/685 |
| 5,764,481 | A | * | 6/1998 | Ruch et al. ............... 361/685 |
| 5,971,780 | A | * | 10/1999 | Youn ............... 439/160 |
| 6,115,245 | A | * | 9/2000 | Ruch et al. ............... 361/685 |
| 6,985,331 | B2 | * | 1/2006 | Oishi et al. ............... 360/133 |
| 6,996,893 | B1 | * | 2/2006 | Ostrander et al. ....... 29/603.03 |

* cited by examiner

*Primary Examiner*—Lisa Lea-Edmonds
*Assistant Examiner*—Anthony M Haughton
(74) *Attorney, Agent, or Firm*—Roberts, Mlotkowski & Hobbes; Thomas W. Cole

(57) ABSTRACT

Provided is a portable electronic device having a removable hard disk drive in which the hard disk drive is adapted to have a slot-type removable shape, thereby allowing the hard disk drive to be conveniently mounted and used, and when the hard disk drive is detached, power is cut off before detaching the hard disk drive, and when the hard disk drive is mounted, power is automatically supplied after the hard disk drive is completely mounted, thereby preventing damage by a voltage shock. The device includes: a case having a mounting opening on one side thereof, the mounting opening connected to a mounting space inside the case, thereby providing a passage to the mounting space, and the mounting space having a connector disposed on the bottom of the inside of the mounting space; a hard disk drive slidingly inserted into the mounting space through the mounting opening of the case, and having terminals which become in contact with the connector when the hard disk drive is completely mounted; and a power switching unit sensing an operation for attaching or detaching the hard disk drive, thereby cutting off power before detaching the hard disk drive and providing power after mounting the hard disk drive.

6 Claims, 9 Drawing Sheets

PORTABLE ELECTRONIC DEVICE HAVING A REMOVABLE HARD DISK DRIVE

CROSS-REFERENCE TO RELATED PATENT APPLICATIONS

This application claims the benefit of Korean Patent Application No. 10-2006-0061922, filed on Jul. 3, 2006, in the Korean Intellectual Property Office, the disclosure of which is incorporated herein in its entirety by reference.

BACKGROUND OF THE INVENTION

1. Field of the Invention

The present invention relates to a portable electronic device providing a variety of functions, including navigation, reproduction of moving pictures, TV broadcasting reception, and reproduction of MP3 files, and more particularly, to a portable electronic device having a removable hard disk drive in which the hard disk drive is adapted to have a slot-type removable shape, thereby allowing the hard disk drive to be conveniently mounted and used, and when the hard disk drive is detached, power is cut off before detaching the hard disk drive, and when the hard disk drive is mounted, power is automatically supplied after the hard disk drive is completely mounted, thereby preventing damage by a voltage shock.

2. Description of the Related Art

In general, representative examples of a portable electronic device which displays images, such as a map or moving pictures, on the screen while the device is being carried or while a user of the device drives a car, include a navigation device, and a portable multimedia player (PMP). Since these navigation device and PMP share a variety of functions, such as navigation, reproduction of moving pictures, TV broadcasting reception and reproduction of MP3 files, these devices can be regarded as substantially identical or similar devices, and have additional memory for storing and reading external data in order to use the external data, such as map data, images and moving picture data. As these memory units, small-sized thin-plate card-type memories, such as secure digital (SD) cards, compact flash (CF) memory cards, and memory sticks, that are miniaturized to fit the characteristics of the navigation devices are mainly used.

However, so far, modules for performing a variety of multimedia functions, such as navigation, TV broadcasting reception, reproduction of MP3 files and reproduction of moving pictures, have been suggested for navigation devices, but a module for storing a large amount of data and when necessary providing the stored data has not been developed. According to a conventional technology, when a user wants to store data received through ground wave, cable or satellite broadcasting, the data should be stored by using the card-type memory as described above, thereby limiting the amount of data that can be stored. Accordingly, there has been an increasing demand for a data storage device which can easily store a large amount of data and can also easily read stored data.

In particular, the size of data files has been increasing day by day and, for example, a navigation device for vehicles has been evolving to have multiple purposes such that the navigation device can allow a user to watch TV broadcasting or digital moving pictures (for example, a movie) in addition to the navigation function. In order to effectively support these functions, a method of easily connecting an additional external memory device to a navigation device, thereby supporting a large size of files in the navigation device, is essentially required.

However, the card-type memory described above has a small capacity, and thus cannot store a large size of files such as moving picture file. Accordingly, it is difficult to use a large size of data in the navigation device. Furthermore, this card-type memory is expensive and with the increasing storage capacity, the price increases exponentially. Accordingly, the memory causes high expenses to users, thereby limiting popularization of the navigation device.

SUMMARY OF THE INVENTION

The present invention provides a portable electronic device having a removable hard disk drive in which the hard disk drive with a large capacity is adapted to have a slot-type removable shape, thereby allowing the hard disk drive to be conveniently mounted, and a large amount of data can be easily provided, and the price burden of a memory can be reduced.

The present invention also provides a portable electronic device having a removable hard disk drive in which when the hard disk drive is detached, power is cut off before detaching the hard disk drive, and when the hard disk drive is mounted, power is automatically supplied after the hard disk drive is completely mounted, thereby preventing damage of the hard disk drive and the device by a voltage shock.

According to an aspect of the present invention, there is provided a portable electronic device having a removable hard disk drive includes: a case having a mounting opening on one side thereof, the mounting opening connected to a mounting space inside the case, thereby providing a passage to the mounting space, and the mounting space having a connector disposed on the bottom of the inside of the mounting space; a hard disk drive slidingly inserted into the mounting space through the mounting opening of the case, and having terminals which become in contact with the connector when the hard disk drive is completely mounted; and a power switching unit sensing an operation for attaching or detaching the hard disk drive, thereby cutting off power before detaching the hard disk drive and providing power after mounting the hard disk drive.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
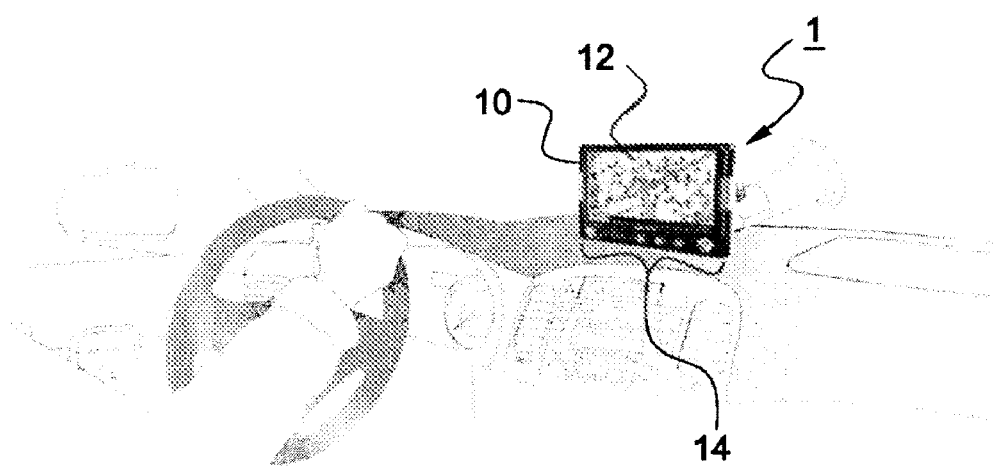
FIG. 1 is a perspective view illustrating a navigation device having a removal hard disk drive according to an embodiment of the present invention.
Figure 2:
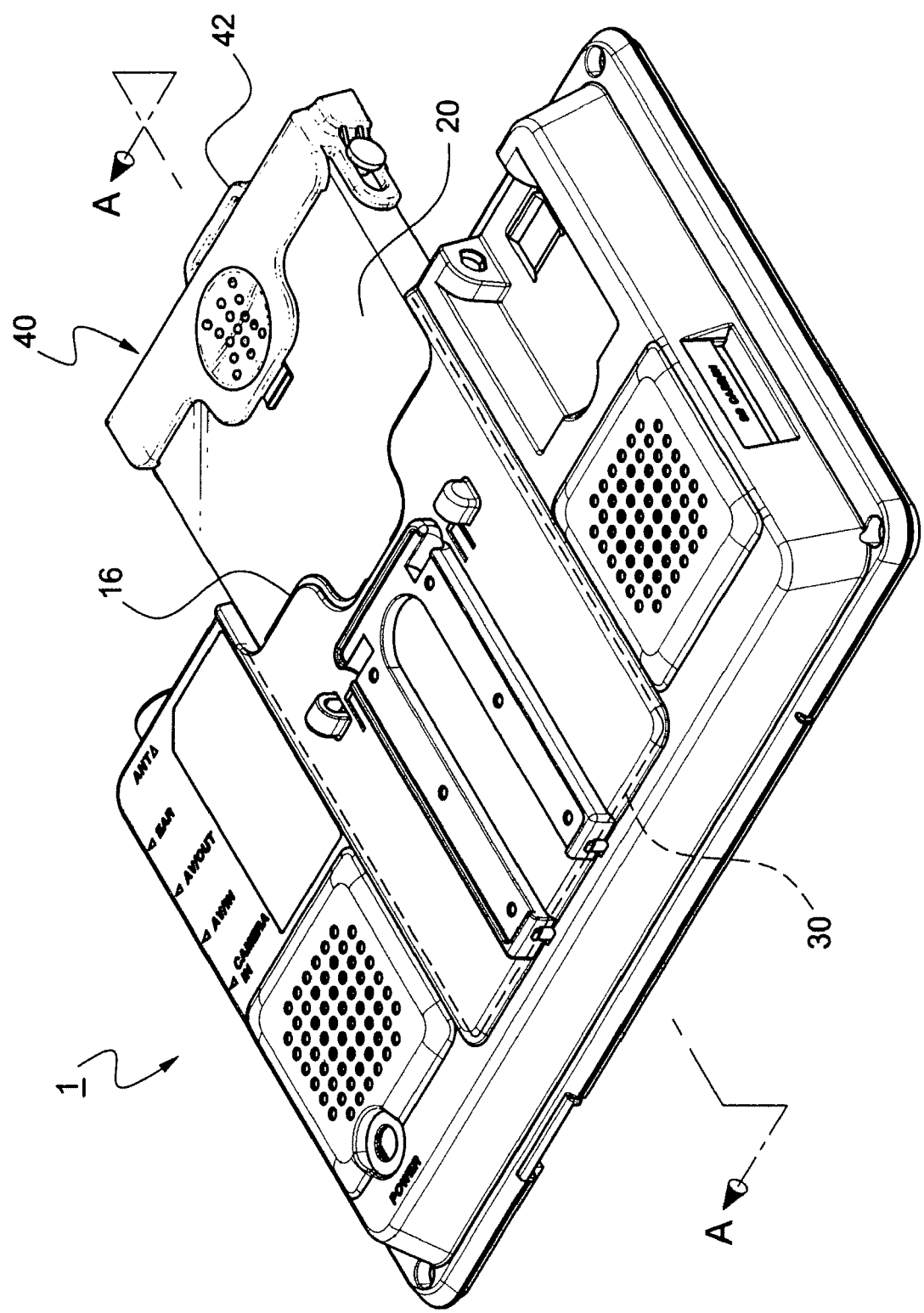
FIG. 2 is a perspective rear view of the navigation device illustrated in FIG. 1 according to an embodiment of the present invention.

FIG. 1 is a perspective view illustrating a navigation device having a removal hard disk drive according to an embodiment of the present invention, and FIG. 2 is a perspective rear view of the navigation device illustrated in FIG. 1 according to an embodiment of the present invention.

The navigation device of the present invention includes those for vehicles, portable navigation devices, and portable multimedia devices such as PMPs, and as a hard disk drive attached to the navigation device may be a 2.5-inch hard disk drive used in a notebook computer. As the navigation device of this embodiment, a navigation device for vehicles is illustrated.

The navigation device 1 of this embodiment includes on the front surface of a case 10 as illustrated in FIG. 1, a display unit 12 displaying an image, and function buttons 14 for setting a variety of states of an image displayed on the display unit 12, and functions of navigation, reproduction of moving pictures, TV broadcasting reception, and reproduction of MP3 files. On the back side of the case 10, a space into which a hard disk drive 20 is mounted is disposed with an opening opened upward, thereby forming a mounting opening 16. If the hard disk drive 20 is inserted downward into the mounting space 30 through this mounting opening 16, the hard disk drive 20 is safely mounted in the mounting space 30 disposed inside the case 10. Through this mounting, the hard disk drive 20 is electrically connected inside the mounting space 30 such that exchange of signals as well as power supply is enabled.

Referring to FIG. 2 which is a perspective rear view of the navigation device 1, the mounting opening 16 for inserting the hard disk drive 20 is disposed on the top part of the back surface of the case 10. Through the mounting opening 16, the hard disk drive 20 is inserted in the vertical direction, and in a state where the hard disk drive 20 is completely inserted, a predetermined part of the top part of the hard disk drive 20 is made to be exposed to the back surface side of the case 10. A disk cover 40 with a handle 42 attached thereto is coupled to the exposed top part of the hard disk drive 20 so that a user can easily grip the hard disk drive 20 for attaching or detaching the hard disk drive 20. This will be explained later in more detail.

Figure 3:
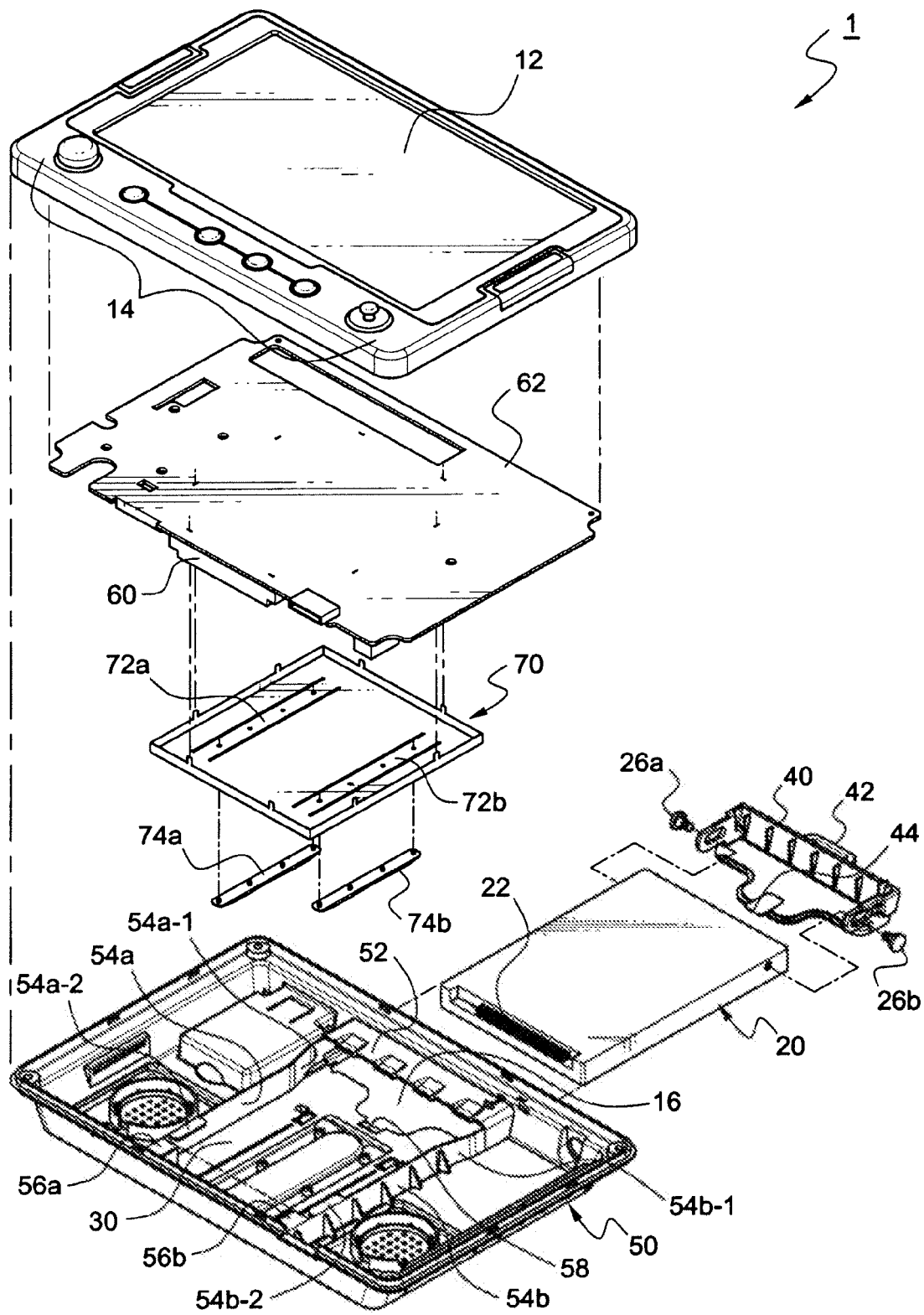
FIG. 3 is a sectional perspective view illustrating an internal structure of a navigation device according to an embodiment of the present invention.
Figure 4:
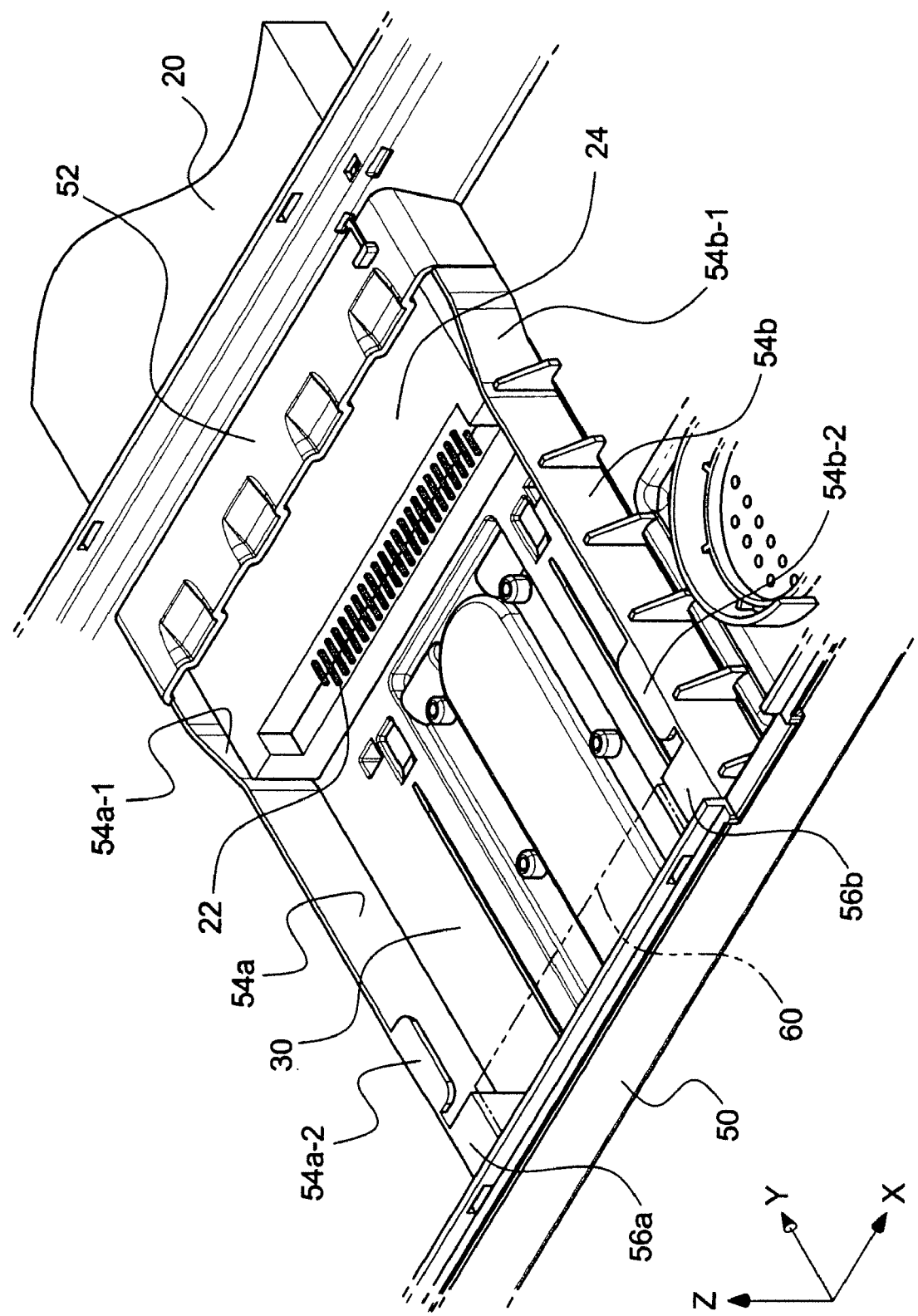
FIG. 4 is a sectional perspective view illustrating the inside of a rear case of a navigation device according to an embodiment of the present invention.
Figure 5:
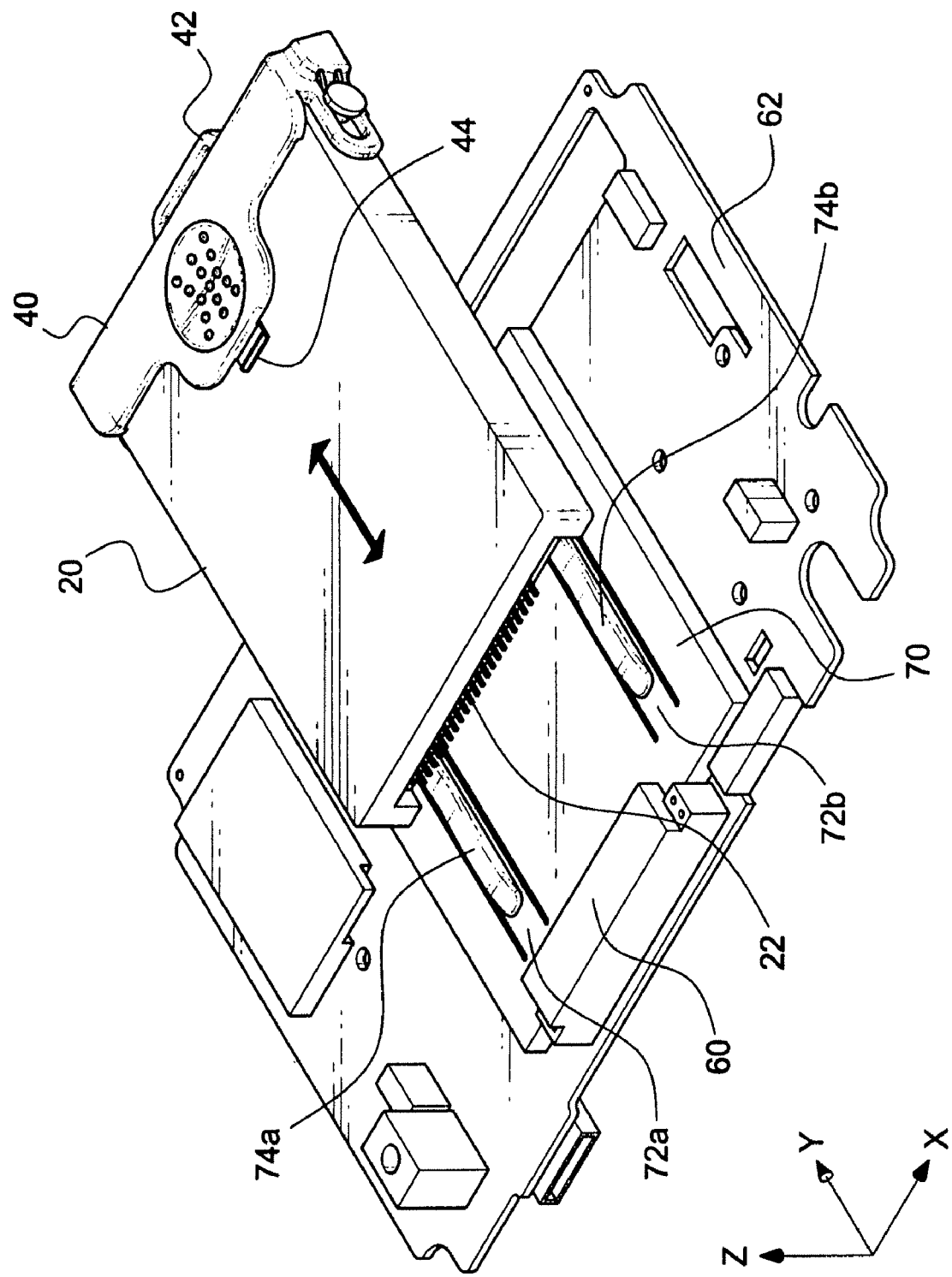
FIG. 5 is a sectional perspective view illustrating an attaching and detaching mechanism of a hard disk drive of a navigation device according to an embodiment of the present invention.

FIG. 3 is a sectional perspective view illustrating an entire structure of a navigation device having a removable hard disk drive according to an embodiment of the present invention, and FIG. 4 is a sectional perspective view illustrating the inside of a rear case of a navigation device according to an embodiment of the present invention. FIG. 5 is a sectional perspective view illustrating an attaching and detaching mechanism of a hard disk drive of a navigation device according to an embodiment of the present invention.

On top of the back surface of the navigation device 1, the mounting opening 16 for mounting the hard disk drive 20 is formed, and the mounting space 30 is disposed inside the navigation device, with being connected to the mounting opening 16, thereby providing a passage.

The mounting space 30 may be formed as illustrated in FIG. 4 such that an inside support plate 52 with a planar shape in parallel with the flat surface of the rear case 50 is integrally formed inside the top part of the rear case 50 of the navigation device and adjacent to the mounting opening 16. Below this inside support plate 52, a pair of left and right side supports 54A and 54B having a distance between the supports 54A and 54B a little greater than the width of the hard disk drive 20 are formed as an integral part of the rear case 50 in a direction in parallel with the mounting direction and perpendicular to the flat surface of the rear case 50. In this way, the mounting space 30 is formed as a space in which the hard disk drive 20 is slidingly inserted and accommodated. In particular, on top of the left and right side supports 54A and 54B, guide ribs 54A-1 and 54B-1, respectively, forming a width therebetween tapering from the top to the bottom are formed to face each other, thereby guiding the hard disk drive 20 at the initial stage of mounting the hard disk drive 20 for easier mounting. As illustrated in FIG. 4, these guide ribs 54A-1 and 54B-1 may have curved shapes, the width between which is gradually decreasing in the direction from the top to the bottom. Also, at the bottom of the left and right side supports 54A and 54B, regulation projections 54A-2 and 54B-2 facing each other and formed perpendicularly to the left and right side supports 54A and 54B, are protruding toward inside so that the bottom part of the hard disk drive 20 can be regulated, thereby prohibiting the movement of the hard disk drive 20 in the back and forth direction (Z-axis direction). Though only a pair of regulation projections 54A-2 and 54B-2 are illustrated in FIG. 4, a plurality of pairs of the regulation projections 54A-2 and 54B-2 may be disposed in the vertical direction at every predetermined interval along the left and right side supports 54A and 54B, or may be disposed continuously in the entire interval along the left and right side supports 54A and 54B. With a predetermined interval from below the regulation projections 54A-2 and 54B-2, stopper 56A and 56B are disposed at the bottom of the mounting space 30, thereby accurately stopping the hard disk drive 20 at a position where the mounting of the hard disk drive 20 is completed, and furthermore, preventing a connector 60 which becomes in contact with the hard disk drive 20, from being damaged in case that the hard disk drive 20 is inserted exceeding the stop position.

The stop position formed by the stoppers 56A and 56B may be about 1~2 mm before a full contact between the hard disk drive 20 and the connector 60, that is, the stoppers 56A and 56B may be formed such that the terminals 22 of the hard disk drive 20 and the connector 60 are connected 1~2 mm short of a full engagement.

The left and right side supports 54A and 54B support the left and right side surfaces of the hard disk drive 20, thereby preventing the hard disk drive 20 from moving to the left and right (X-axis direction) when the hard disk drive 20 is inserted. The inside support plate 52 and regulation projections 54A-2 and 54B-2 prevent the hard disk drive 20 from moving back and forth (Z-axis direction). In the vertical direction (Y-axis direction), the stoppers 56A and 56B stop the hard disk drive 20 slidingly inserted at the exact stop position for the mounting.

At the bottom of the mounting space 30 formed as described above, the connector 60 fixed to a printed circuit board (PCB) 62 is disposed. Accordingly, as the hard disk drive 20 is slidingly inserted, the terminals 22 of the hard disk drive 20 are inserted into the connector 60, thereby being in contact with the connector 60.

Meanwhile, a leaf spring 70 is mounted on a part of the PCB 62 which is faced to the mounting space 30, the part facing the mounting space 30. As a result, this leaf spring 70 is disposed at a position facing one surface of the hard disk drive 20 inserted and mounted. On the left and right side of this leaf spring 70, spring portions 72A and 72B with elasticity that are disposed in the direction in parallel to the hard disk drive mounting direction, and elastically support the part facing the spring portions 72A and 72B, of the hard disk drive 20 being inserted, are formed. The spring portions 72A and 72B support the surface of the hard disk drive 20 being mounted through elastically pressuring the hard disk drive 20, thereby guiding the hard disk drive 20 to slide without shaking. Accordingly, the spring portions 72A and 72B become essentially in close contact with the one surface of the hard disk drive 20 and the resultant friction may cause damage to the contact surface of the hard disk drive 20. In order to prevent this damage, non-metallic insulating lubricant members 74A and 74B having lubricant, flexible and insulating characteristics are disposed on the spring portions 72A and 72B. As materials for the non-metallic insulating lubricant members 74A and 74B, synthetic resins, for example, polyoxymethylene (POM), can be used, and furthermore, rubbers or fabrics can also be used. These insulating lubricant members 74A and 74B are in contact with a PCB 24 formed on one side of the hard disk drive 20, thereby reducing friction when the hard disk drive 20 is inserted, and thus preventing damage by the insertion action. Furthermore, the spring portions 72A and 72B on which these insulating lubricant members 74A and 74B are disposed restrict the back and forth movement of the hard disk drive 20 when the hard disk drive 20 is mounted, and prevent electric short.

Also, when the hard disk drive is attached to or detached from the navigation device 1, the navigation device 1 cuts off power supplied to the hard disk drive 20, thereby protecting the hard disk drive 20 from an electric shock and also stabilizing the overall system of the navigation device 1. A mechanism to implement this function will be explained later in more detail.

Figure 6:
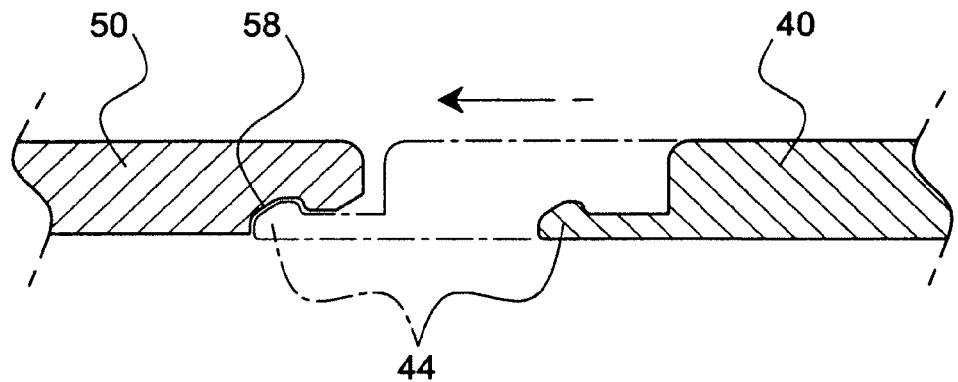
FIG. 6 is an operation diagram illustrating the operation of a hook and a hooking groove of a navigation device according to an embodiment of the present invention.

FIG. 6 is an operation diagram illustrating the operation and effect of a hook and a hooking groove of the navigation device 1 according to an embodiment of the present invention, which is seen in the direction of A-A line illustrated in FIG. 2. Referring to FIG. 6 together with FIG. 3, a method of inserting and fixing the hard disk drive 20 in the navigation device 1 will now be explained in more detail.

In the navigation device 1, if the hard disk drive 20 is fully inserted into the mounting space 30, a hook 44 disposed on the disk cover 40 is engaged and coupled with a hooking groove 58 formed on an inner surface of the rear case 50. As a result, unless an external force pulling the hard disk drive 20 greater than a predetermined magnitude is applied, the hard disk drive 20 is not detached from the navigation device 1.

On at least any one of this hook 44 and the hooking groove 58, a curve or slope surface is formed in the attaching and detaching direction, thereby allowing the hook 44 to be separated from the hooking groove 58 when a user grips the handle 42 of the disk cover 40 and pulls the handle 42 with a predetermined force. Also, the hook 44 may be formed to have elasticity enough to be pushed backward to a predetermined extent, or since the hard disk drive 20 is elastically supported by the leaf spring 70, the hard disk drive 20 itself may be pushed backward to a predetermined extent, thereby supporting the action.

Figure 7:
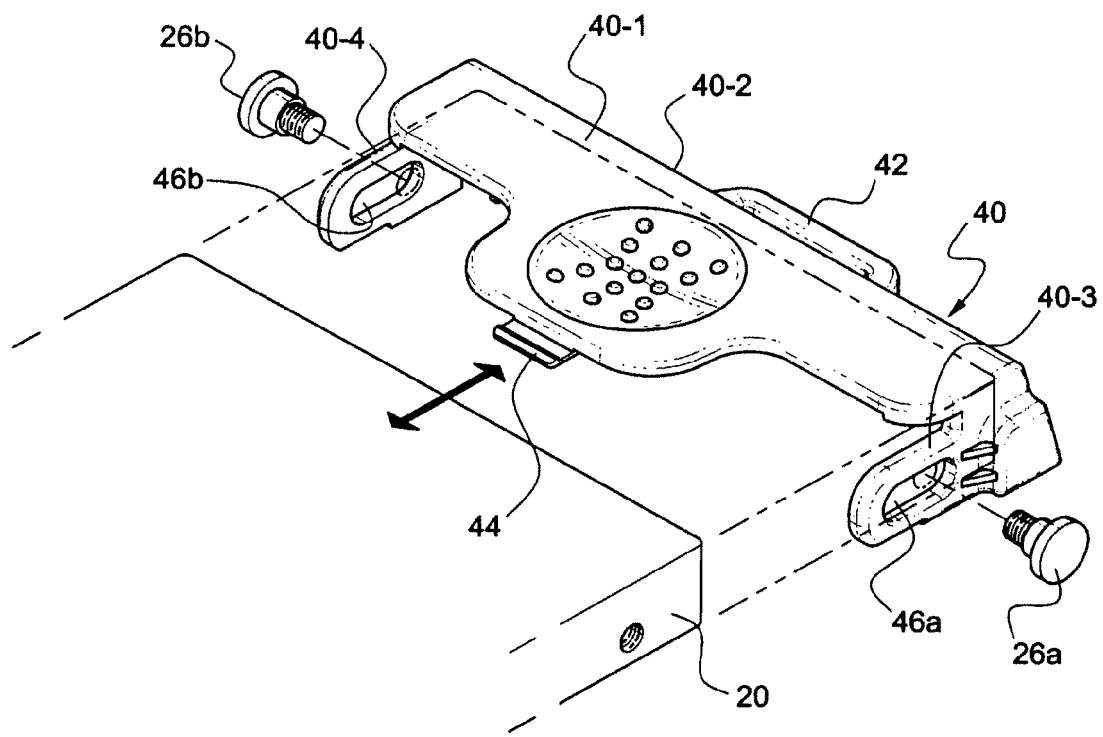
FIGS. 7 and 8 are diagrams illustrating in more detail a structure for coupling a hard disk drive cover and a hard disk drive and an automatic power switching mechanism according to an embodiment of the present invention.
Figure 8:
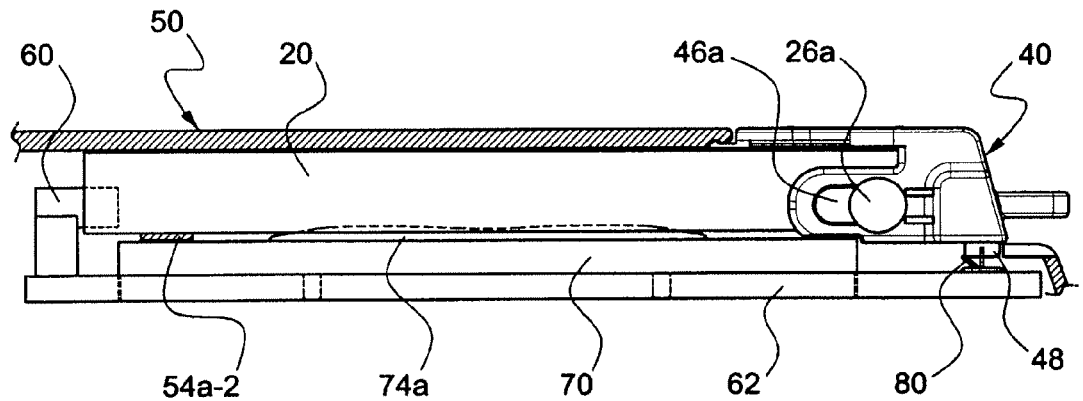
Figure 9:
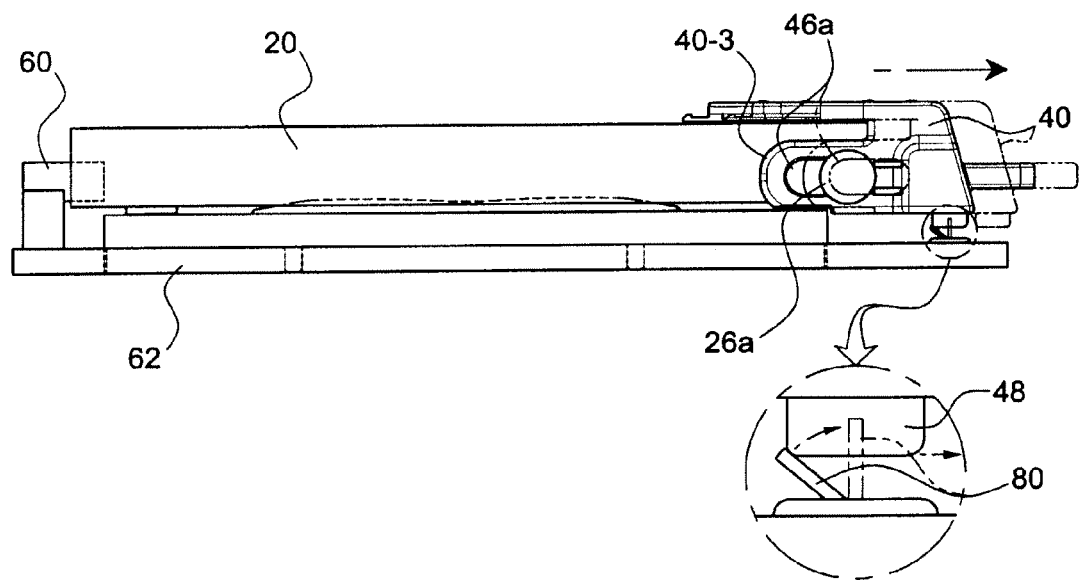
FIG. 9 is a diagram illustrating an operation of detaching a hard disk drive from a navigation device according to an embodiment of the present invention.
Figure 10:
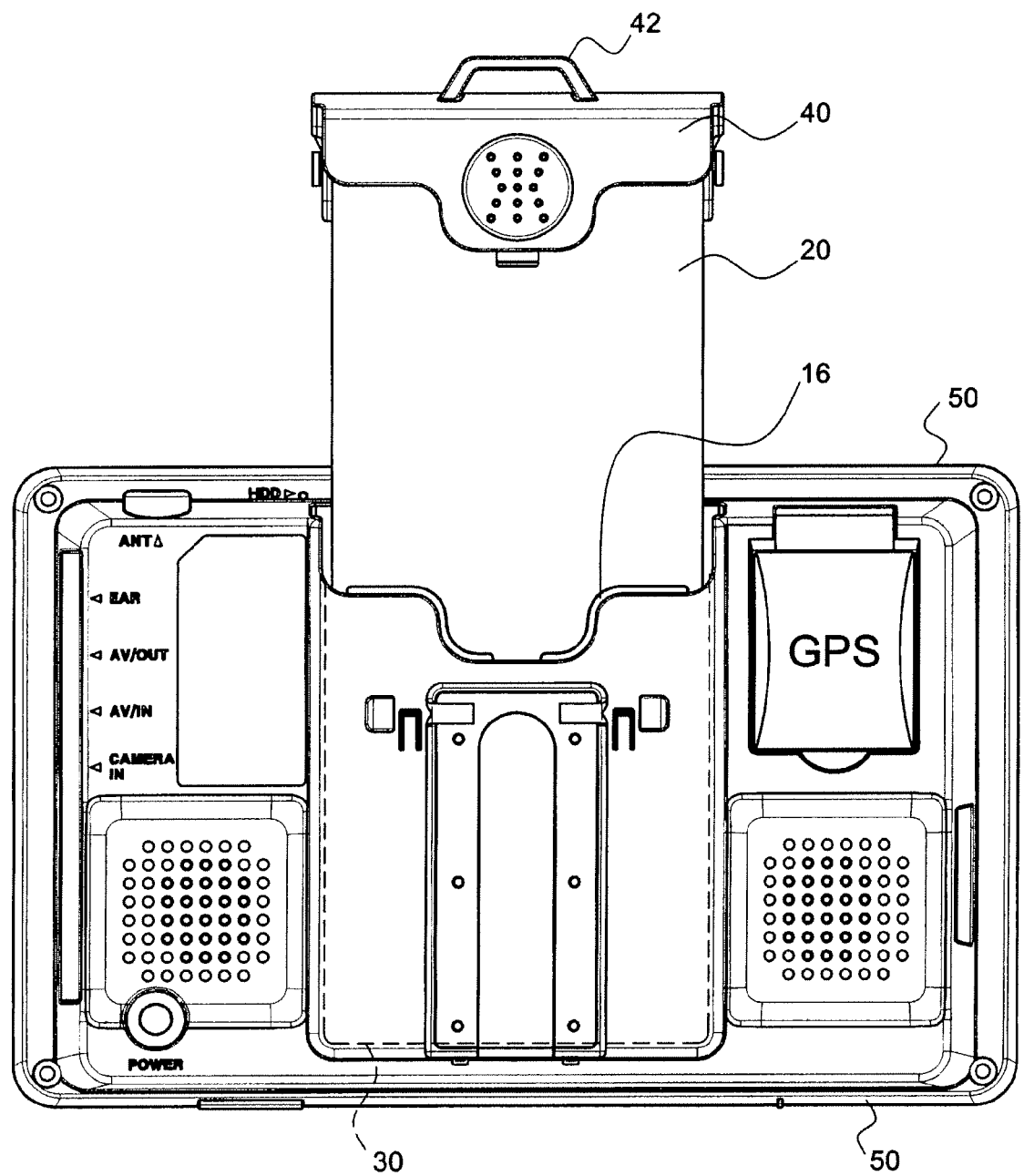
FIG. 10 is a rear elevational view illustrating a state of a hard disk drive detached from a navigational device according to an embodiment of the present invention.
Figure 11:
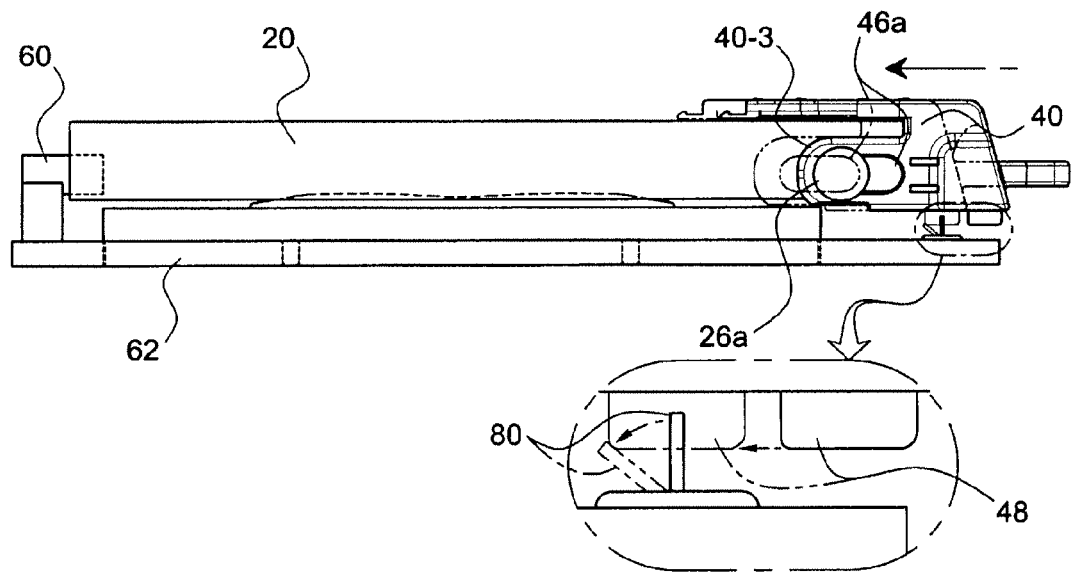
FIG. 11 is a diagram illustrating an operation performed when a hard disk drive is attached to a navigation device according to an embodiment of the present invention.
Figure 12:
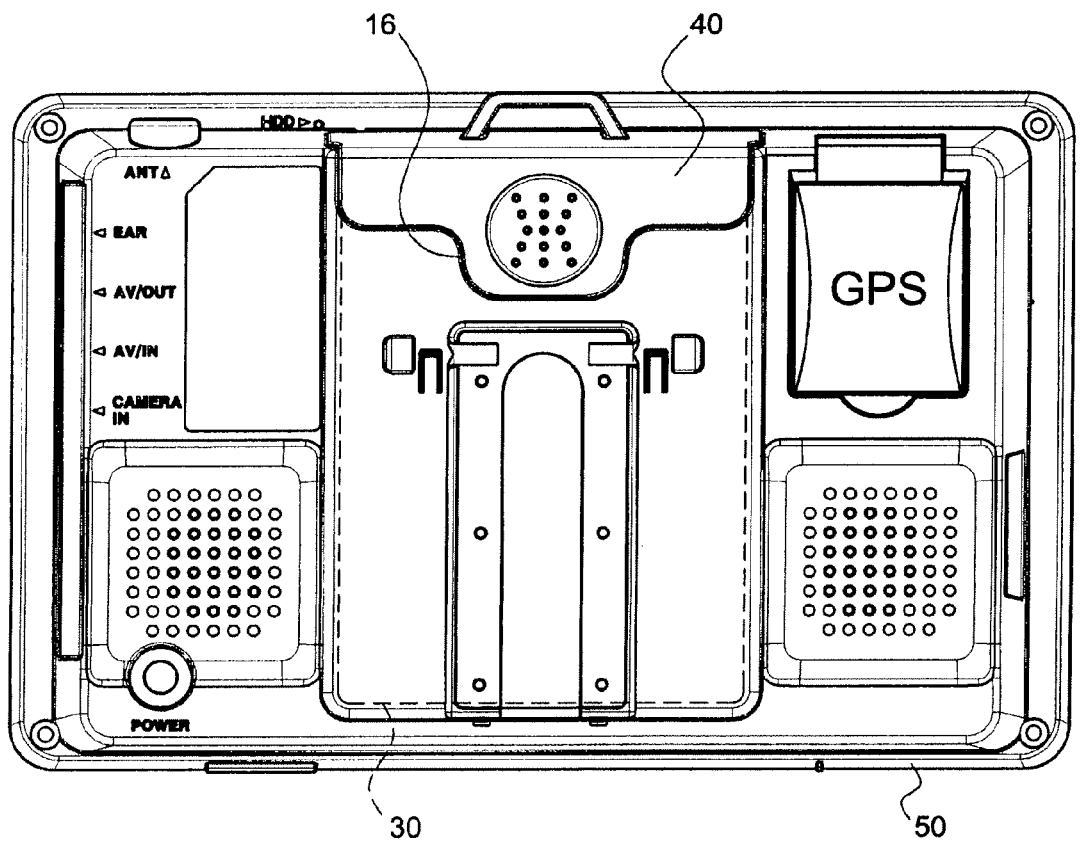
FIG. 12 is a rear elevational view illustrating a state of a hard disk drive attached to a navigation device according to an embodiment of the present invention.

FIGS. 7 and 8 are diagrams illustrating in more detail a structure for coupling a hard disk drive cover and a hard disk drive and an automatic power switching mechanism according to an embodiment of the present invention. FIG. 9 is a diagram illustrating an operation of detaching a hard disk drive from a navigation device according to an embodiment of the present invention. FIG. 10 is a rear elevational view illustrating a state of a hard disk drive detached from a navigation device according to an embodiment of the present invention. Also, FIG. 11 is a diagram illustrating an operation performed when a hard disk drive is attached to a navigation device according to an embodiment of the present invention, and FIG. 12 is a rear elevational view illustrating a state of a hard disk drive attached to a navigation device according to an embodiment of the present invention. Operations of the navigation device for attaching and detaching will now be explained in more detail with reference to FIGS. 7 through 12.

The disk cover 40 are coupled with the hard disk drive 20 to be moved from the hard disk drive 20 within a predetermined distance in the attaching and detaching direction of the hard disk drive 20. That is, the disk cover 40 has a shape surrounding the front surface and both side surfaces of the hard disk drive 20. On the front surface plate 40-1 of the disk cover 40, the hook 44 is extendedly formed, and on the top surface plate 40-2 of the disk cover 40, the handle 42 is disposed. On both sides of the disk cover 40, left and right side plates 40-3 and 40-4, respectively, each having a slot hole 46A and 46B, are formed. Fixing pins 26A and 26B are fixed to the hard disk drive 20, with being inserted through the slot holes 46A and 46B of the left and right side plates 40-3 and 404. Accordingly, as the slot holes 46A and 46B moves about the fixing pins 26A and 26B, respectively, the disk cover 40 becomes close to or distant from the hard disk drive 20 within the length of the slot holes 46A and 46B. This is a structure and operation required for safely controlling power supplied to the hard disk drive 20 when the hard disk drive 20 is attached to or detached from the navigation device 1. In addition to this, a power activating protrusion 48 is protruding on one side of the disk cover 40. An attaching/detaching sensor 80 operated by this power activating protrusion 48 and for turning on or off power supplied to the connector 60 is disposed inside the mounting space 30 of the navigation device 1, thereby forming a power switching unit. This attaching/detaching sensor 80 can be implemented, for example by an on/off switch or a limit switch. According to the attaching/detaching sensor 80, when the hard disk drive 20 is mounted, after the mounting of the hard disk drive 20 is completed, the power activating protrusion 48 of the disk cover 40 presses the attaching/detaching sensor 80, thereby turning power on. When the hard disk drive 20 is detached, before the terminals 22 of the hard disk drive 20 are separated from the connector 60, the power activating protrusion 48 is first separated from the attaching/detaching sensor 80, thereby turning power off. As the fixing pins 26A and 26B described above, screws may be used.

The operation of attaching and detaching the hard disk drive 20 will now be explained in more detail. When the hard disk drive 20 is detached from the navigation device 1, if the handle 42 of the disk cover 40 is pulled, the slot holes 46A and 46B of the left and right side plate 40-3 and 40-4 move first from the fixing pins 26A and 26B fixed to the both side surfaces of the hard disk drive 20, and thus the disk cover 40 moves to the extent of the length of the slot holes 46A and 46B. As a result, the power activating protrusion 48 which pressed the attaching/detaching sensor 80 also moves out of it, thereby turning off the attaching/detaching sensor 80 and thus cutting off power provided to the connector 60. Then, if the handle 42 is pulled further, the bottom end of the slot holes 46A and 46B are hung on the fixing pins 26A and 26B, and thus the disk cover 40 and the hard disk drive 20 are pulled together and separated from the mounting space 30.

Reversely, when the hard disk drive 20 is mounted, the hard disk drive 20 is made to stand upright with the handle 42 of the disk cover 40 being gripped, and then the hard disk drive 20 is inserted into the mounting space 30 in a state in which the bottom ends of the slot holes 46A and 46B of the disk cover 40 are hung on the fixing pins 26A and 26B, and therefore the distance between the disk cover 40 and the hard disk drive 20 is the same as the length of the slot holes 46A and 46B. After the hard disk drive 20 is inserted into the mounting space 30 and the terminals 22 of the hard disk drive 20 are coupled with the connector 60, if the disk cover 40 is further pushed in, from the bottom ends to the top ends of the slot holes 46A and 46B of the disk cover 40 move along the fixing pins 26A and 26B. Accordingly, the power activating protrusion 48 finally presses the attaching/detaching sensor 80, thereby turning power on, and thus providing power to the connector 60 already connected to the terminals 22.

Meanwhile, when the hard disk drive 20 is detached from the navigation device 1 and, for example, only the navigation or TV reception function is used, only the disk cover 40 that is not coupled with the hard disk drive 20 may be coupled to the mounting opening 16 through which the hard disk drive 20 is inserted. This disk cover 40 may be separated from the hard disk drive 20 with which the disk cover 40 has been coupled and then used. Alternatively, an additional disk cover may be provided for convenience.

Though the navigation device for vehicles is explained above as an embodiment of the present invention, the present invention can also be applied to portable devices, such as portable communications terminals, PMPs, and DMBs, in addition to the navigation device. In addition to the vertical direction for inserting the hard disk drive, the hard disk drive may be inserted in the horizontal direction with a little modification for the direction. Accordingly, the present invention includes this variation in the types of device and the modification of the inserting direction.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

According to the portable electronic device having a removable hard disk drive according to the present invention as described above, a large capacity hard disk drive can be formed to have a slot-type removable shape, and thus can be easily mounted, thereby allowing a large amount of data to be easily supported. Also, since a hard disk drive which is cheaper than other memory devices can be easily used, the price burden of a memory can be reduced.

This will provide an effect of easily supporting storage and reproduction of a large amount of data and promoting penetration of portable electronic devices, thereby contributing to popularization of the devices. For example, while a TV program of a predetermined channel is viewed, if a user encounters a situation in which the user cannot watch the TV program for a while, the TV program data can be stored in the hard disk drive, and then, later the TV program data not watched can be displayed, thereby allowing the user to watch the remaining part that the user cannot watch due to the situation.

Furthermore, when the hard disk drive of the navigation device is detached, power is cut off before detaching the hard disk drive, and when the hard disk drive is mounted, power is automatically supplied after the hard disk drive is completely mounted, thereby preventing damage by a voltage shock.

What is claimed is:

1. A portable electronic device having a removable hard disk drive, the portable electronic device comprising:

a case having a mounting opening on one side thereof, the mounting opening connected to a mounting space inside the case, thereby providing a passage to the mounting space, and the mounting space having a connector disposed on the bottom of the inside of the mounting space;

a hard disk drive slidingly inserted into the mounting space through the mounting opening of the case, and having terminals which become in contact with the connector when the hard disk drive is completely mounted;

a power switching unit sensing an operation for attaching or detaching the hard disk drive, thereby cutting off power before detaching the hard disk drive and providing power after mounting the hard disk drive, and a disk cover mounted on the upper part of the hard disk exposed through the mounting opening and having a handle disposed on the surface of the disk cover, wherein on a rear case of the case, inside support plate formed adjacent to the mounting opening and in parallel with the flat surface of the rear case, and supporting the inner surface of the hard disk drive is disposed and a pair of left and right side supports formed from below the inside support plate downward in the direction of mounting the hard disk drive, having an interval a little greater than the width of the hard disk drive between the left and right side supports, thereby supporting both side surfaces of the hard disk drive are disposed, thereby forming the mounting space divided by the inside support plate and the left and right side supports, and wherein a pair of left and right guide ribs having an interval between the ribs tapering from the top to the bottom of the interval are disposed on top of the left and right side supports adjacent to the mounting opening, regulation projections facing each other and formed perpendicularly to the left and right side supports and protruding toward inside, thereby preventing the movement of the hard disk drive in the back and forth direction, are disposed at the bottom of the left and right side supports, and stoppers protruding from the rear case and stopping the hard disk drive at a position where the hard disk drive is completely mounted are disposed on the bottom end of the mounting space.

2. The portable electronic device of claim 1, wherein a hook which is inserted into the mounting space of the case when the hard disk drive is completely mounted is disposed on the disk cover, and a hooking groove which the hook is inserted into and coupled with is formed on an inner wall adjacent to the mounting opening of the case and forming part of the mounting space.

3. The portable electronic device of claim 1, further comprising:

a leaf spring having a spring portion elastically supporting one surface of the hard disk drive, and a non-metallic insulating lubricant member attached to the spring portion and for reducing contact friction with the hard disk drive being slidingly inserted.

4. The portable electronic device of claim 3, wherein the non-metallic insulating lubricant member is made of synthetic resins having lubricant and insulating characteristics.

5. The portable electronic device of claim 1, wherein the power switching unit comprises a power activating protrusion formed on the disk cover and an attaching/detaching sensor turning on or off power provided to the connector.

6. The portable electronic device of claim 5, further comprising:

slot holes formed on the left and right side plates of the disk cover; and fixing pins penetrating the slot holes and fixed to both side surfaces of the hard disk drive, wherein when the hard disk drive is detached from the mounting space, the slot holes move from the fixing pins and the disk cover first moves, thereby allowing the power activating protrusion to operate the attaching/detaching sensor before the hard disk drive is pulled out, and thus cutting off power provided to the connector, and when the hard disk drive is mounted, after the hard disk drive is completely inserted into the mounting space, the slot holes move from the fixing pins and then, when the disk cover is fully inserted, the power activating protrusion operates the attaching/detaching sensor, thereby providing power to the connector.

* * * * *